US012562596B2

(12) United States Patent
Lee et al.

(10) Patent No.: US 12,562,596 B2
(45) Date of Patent: Feb. 24, 2026

(54) MULTIPHASE POWER SUPPLY APPARATUS FOR WIRELESS POWER TRANSMISSION AND CONTROL METHOD THEREOF

(71) Applicant: WIPOWERONE.INC, Daejeon (KR)

(72) Inventors: Kyo-Il Lee, Sejong (KR); Seong-Joo Kang, Daejeon (KR); Yong-Dal Lee, Daejeon (KR); Dong-Kwan Seo, Daejeon (KR); Tae-Yeon Lee, Daejeon (KR); Byung-Ju Lee, Daejeon (KR); Dong-Ho Cho, Daejeon (KR)

(73) Assignee: WIPOWERONE.INC, Daejeon (KR)

( * ) Notice: Subject to any disclaimer, the term of this patent is extended or adjusted under 35 U.S.C. 154(b) by 0 days.

(21) Appl. No.: 18/678,200

(22) Filed: May 30, 2024

(65) Prior Publication Data

US 2024/0348096 A1 Oct. 17, 2024

Related U.S. Application Data

(63) Continuation of application No. PCT/KR2023/001678, filed on Feb. 6, 2023.

(30) Foreign Application Priority Data

| | | |
|---|---|---|
| Feb. 4, 2022 | (KR) | 10-2022-0015130 |
| Apr. 29, 2022 | (KR) | 10-2022-0053656 |
| May 17, 2022 | (KR) | 10-2022-0059961 |

(51) Int. Cl.
*H02J 50/10* (2016.01)
*H01F 27/28* (2006.01)
*H02J 50/40* (2016.01)
*H02J 50/90* (2016.01)

(52) U.S. Cl.
CPC .............. *H02J 50/10* (2016.02); *H01F 27/28* (2013.01); *H02J 50/402* (2020.01); *H02J 50/90* (2016.02)

(58) Field of Classification Search
None
See application file for complete search history.

(56) References Cited

U.S. PATENT DOCUMENTS

| | | | |
|---|---|---|---|
| 2010/0135553 A1* | 6/2010 | Joglekar | A61B 6/12 |
| | | | 382/128 |
| 2020/0259356 A1* | 8/2020 | Mao | H02J 3/48 |
| 2021/0352774 A1* | 11/2021 | Choi | H02M 1/008 |
| 2022/0006328 A1* | 1/2022 | Bae | H02J 50/80 |

* cited by examiner

*Primary Examiner* — Daniel Kessie
(74) *Attorney, Agent, or Firm* — LEX IP MEISTER, PLLC

(57) ABSTRACT

A multiphase power supply apparatus for wireless power transmission and a control method thereof are disclosed. The multiphase power supply apparatus includes two power supply coils and coupling coefficient between the power supply coils is below a predetermined value. When it is determined that a deviation in alignment with the corresponding pickup has occurred, the phase difference between the inverters is adjusted. When adjusted to the optimum phase difference, the output of the pickup coils becomes uniform, even if there is a deviation in the alignment between the power supply apparatus and the pickup.

13 Claims, 11 Drawing Sheets

Inductance (uH)

| | Tx_Circular | Tx_DD | Rx_Circular | Rx_DD |
|---|---|---|---|---|
| Tx_Circular | 76.660 | -0.011 | 8.533 | -0.001 |
| Tx_DD | -0.011 | 88.569 | -0.001 | 8.049 |
| Rx_Circular | 8.533 | -0.001 | 78.636 | -0.012 |
| Rx_DD | -0.001 | 8.049 | -0.012 | 91.446 |

Inductive Coupling Coefficient

| | Tx_Circular | Tx_DD | Rx_Circular | Rx_DD |
|---|---|---|---|---|
| Tx_Circular | 1.000 | 0.000 | 0.110 | 0.000 |
| Tx_DD | 0.000 | 1.000 | 0.000 | 0.089 |
| Rx_Circular | 0.110 | 0.000 | 1.000 | 0.000 |
| Rx_DD | 0.000 | 0.089 | 0.000 | 1.000 |

X : 0mm, Y : 100mm

Inductance (uH)

| | Tx_Circular | Tx_DD | Rx_Circular | Rx_DD |
|---|---|---|---|---|
| Tx_Circular | 76.775 | -0.009 | 7.826 | -0.001 |
| Tx_DD | -0.009 | 88.512 | -0.002 | 7.628 |
| Rx_Circular | 7.826 | -0.002 | 78.664 | -0.013 |
| Rx_DD | -0.001 | 7.628 | -0.013 | 91.435 |

Inductive Coupling Coefficient

| | Tx_Circular | Tx_DD | Rx_Circular | Rx_DD |
|---|---|---|---|---|
| Tx_Circular | 1.000 | 0.000 | 0.101 | 0.000 |
| Tx_DD | 0.000 | 1.000 | 0.000 | 0.085 |
| Rx_Circular | 0.101 | 0.000 | 1.000 | 0.000 |
| Rx_DD | 0.000 | 0.085 | 0.000 | 1.000 |

X : 75mm, Y : 0mm

Inductance (uH)

| | Tx_Circular | Tx_DD | Rx_Circular | Rx_DD |
|---|---|---|---|---|
| Tx_Circular | 76.722 | -0.232 | 8.149 | -1.657 |
| Tx_DD | -0.232 | 88.416 | 3.073 | 6.971 |
| Rx_Circular | 8.149 | 3.073 | 78.658 | 0.093 |
| Rx_DD | -1.657 | 6.971 | 0.093 | 91.386 |

Inductive Coupling Coefficient

| | Tx_Circular | Tx_DD | Rx_Circular | Rx_DD |
|---|---|---|---|---|
| Tx_Circular | 1.000 | -0.003 | 0.105 | -0.020 |
| Tx_DD | -0.003 | 1.000 | 0.037 | 0.078 |
| Rx_Circular | 0.105 | 0.037 | 1.000 | 0.001 |
| Rx_DD | -0.020 | 0.078 | 0.001 | 1.000 |

X : 75mm, Y : 100mm

Inductance (uH)

| | Tx_Circular | Tx_DD | Rx_Circular | Rx_DD |
|---|---|---|---|---|
| Tx_Circular | 76.807 | -0.192 | 7.470 | -1.562 |
| Tx_DD | -0.192 | 88.364 | 2.888 | 6.614 |
| Rx_Circular | 7.470 | 2.888 | 78.699 | 0.065 |
| Rx_DD | -1.562 | 6.614 | 0.065 | 91.390 |

Inductive Coupling Coefficient

| | Tx_Circular | Tx_DD | Rx_Circular | Rx_DD |
|---|---|---|---|---|
| Tx_Circular | 1.000 | -0.002 | 0.096 | -0.019 |
| Tx_DD | -0.002 | 1.000 | 0.035 | 0.074 |
| Rx_Circular | 0.096 | 0.035 | 1.000 | 0.001 |
| Rx_DD | -0.019 | 0.074 | 0.001 | 1.000 |

FIG. 8

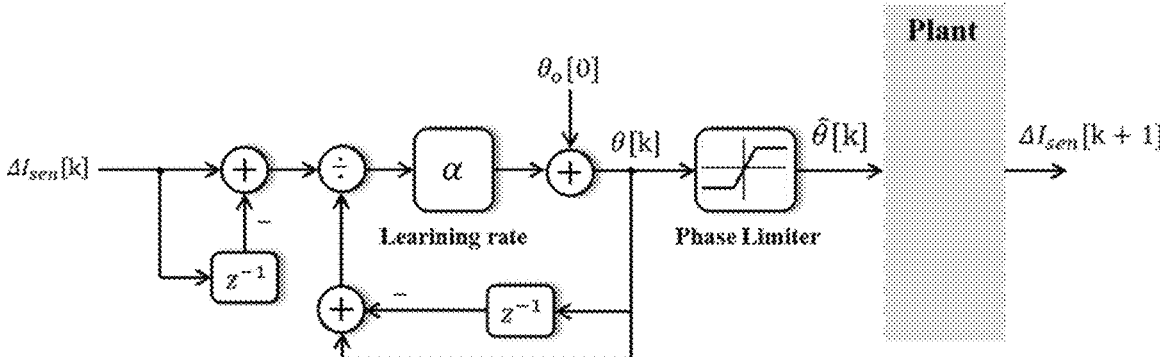

FIG. 9

Storing mutual inductance between each coil when power supply apparatus and pickup are aligned and when misaligned ⎯ S210

Calculating appropriate phase difference for each of stored mutual inductances, determining phase of each inverter's output, and storing as the initial setting ⎯ S220

Measuring output of pickup (or power supply apparatus) ⎯ S230

Estimating voltage in each state by combining stored mutual inductances with measured output and determining mutual inductance that leads to the largest value ⎯ S240

Determining initial setting corresponding to determined mutual inductance as phase estimate ⎯ S250

FIG. 10
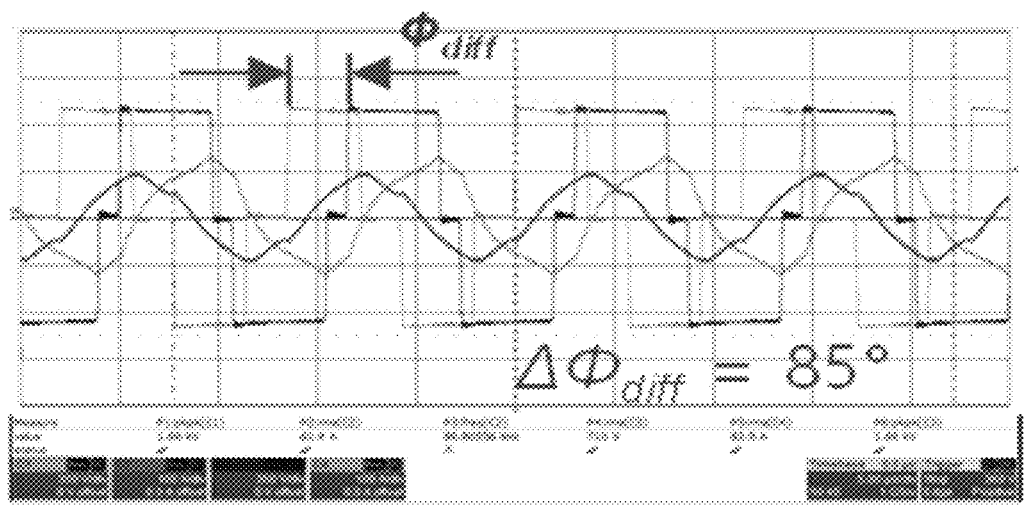
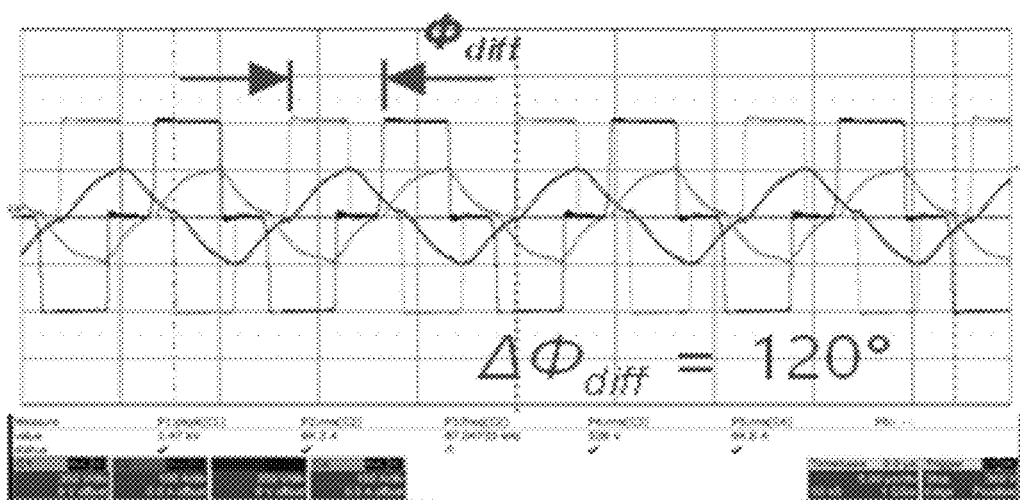

1

MULTIPHASE POWER SUPPLY APPARATUS FOR WIRELESS POWER TRANSMISSION AND CONTROL METHOD THEREOF

TECHNICAL FIELD

The present invention relates to a multiphase power supply apparatus for wireless power transmission and a control method thereof, and more particularly, to a multiphase power supply apparatus including a plurality of power supply coils, each coil capable of being supplied with a current having a different phase and a method for controlling the multiphase power supply apparatus when it is determined that a misalignment with corresponding pickup has occurred.

BACKGROUND

Wireless charging is revolutionizing the experience and safety of charging devices when compared to traditional conductive charging. As wireless charging technology continues to evolve, the use of wireless charging in the electric transport sector is becoming increasingly common, with a shift towards designs that prioritize high power, power density, versatility and scalability.

In the document titled 'A 50-kW three-phase wireless power transfer system using bipolar windings and series resonant networks for rotating magnetic fields' by PRIES, Jason, et al., published in IEEE Transactions on Power Electronics in 2019, a three-phase inductive wireless power transmission system utilizing bipolar phase windings is disclosed. The system utilized a rotating magnetic field to achieve temporally smoother power transfer characteristics than a single-phase system. The system also transmitted 50 kW with 95% efficiency across a 150 mm air gap when the power supply and pickup were aligned.

However, in the power supply coil structure of the document, the coupling coefficient between the power supply coils is greater than 0.3, which can complicate the control of the multiphase power supply and cause losses in power transmission. Furthermore, if there is a deviation in the alignment between the power supply and the pickup, the output of each coil of the pickup may become uneven.

SUMMARY OF THE INVENTION

The present invention aims to solve the above problems by providing a multiphase power supply apparatus for wireless power transmission having a plurality of power supply coils, wherein the coupling coefficients between different power supply coils are low, and wherein the apparatus can be controlled to ensure uniform output over the pickup coils even when there are deviations in the alignment between the pickup and the power supply coils. It also aims to provide a control method for such a multiphase power supply apparatus for wireless power transmission.

To solve the above problems, according to one aspect of the present invention, there is provided a power supply apparatus for wireless power transmission, a first power supply coil; a first inverter electrically connected with the first power supply coil; a second power supply coil having a coupling coefficient with the first power supply coil below a predetermined value; a second inverter electrically connected to the second power supply coil and controllable independently of the first inverter; and a control unit for regulating a phase difference between an output of the first inverter and an output of the second inverter when it is determined that a deviation in alignment with a corresponding pickup has occurred.

Preferably, the first power supply coil and the second power supply coil are a combination of a circular coil and a DD coil or a combination of a DD coil and a DD coil.

The first power supply coil and the second power supply coil may be arranged to at least partially overlap each other.

Preferably, the power supply apparatus further comprises a power supply core and the power supply core includes protruded portions that fill empty spaces remaining after the first power supply coil or the second power supply coil is not superimposed on each other.

Preferably, the coupling coefficient between the first power supply coil and the second power supply coil is 0.3 or less.

Preferably, the control unit determines that a deviation in alignment with the corresponding pickup has occurred when a difference between the output of the first inverter and the output of the second inverter is greater than a predetermined value, and adjusts the phase difference between the output of the first inverter and the output of the second inverter so that the difference is less than or equal to the predetermined value.

Alternatively, the control unit determines that a deviation in alignment with the corresponding pickup has occurred when a difference between a duty ratio of the first inverter and a duty ratio of the second inverter is greater than a predetermined value, and adjusts the phase difference between the output of the first inverter and the output of the second inverter so that the difference is less than or equal to the predetermined value.

Alternatively, the control unit determines that a deviation in alignment with the corresponding power supply has occurred when a difference between outputs of the rectifiers connected to pickup coils of the corresponding pickup is greater than a predetermined value, and adjusts the phase difference between the output of the first inverter and the output of the second inverter so that the difference between the outputs is less than or equal to the predetermined value.

Preferably, if an output of the corresponding pickup is less than a required level, the control unit calculates a duty ratio of the first inverter and the second inverter for the output to reach the required level and, if the calculated duty ratio is less than a predetermined upper limit value, the control unit applies the calculated duty ratio or, if the calculated duty ratio is greater than the predetermined upper limit value, the control unit increases DC input voltages of the first inverter and the second inverter.

The power supply apparatus may further comprises: a third power supply coil having a coupling coefficient with the first power supply coil and the second power supply coil below a predetermined value; a third inverter electrically connected to the third power supply coil and independently controllable with respect to the first inverter and the second inverter, and the control unit is capable of controlling a phase of the output of the third inverter.

According to other aspect of the present invention, there is provided a method for controlling the power supply apparatus for wireless power transmission, comprising the steps of: (a) determining whether a deviation in alignment with the corresponding pickup has occurred; and (b) adjusting a phase difference between an output of the first inverter and an output of the second inverter.

Preferably, in the step (a), determining that a deviation in alignment with the corresponding pickup has occurred if a difference between the output of the first inverter and the output of the second inverter is greater than a predetermined value and, in the step (b), adjusting the phase difference between the output of the first inverter and the output of the second inverter until the difference between the output of the first inverter and the output of the second inverter is less than or equal to the predetermined value.

Preferably, in the step (a), determining that a deviation in alignment with the corresponding pickup has occurred if a difference between a duty ratio of the first inverter and a duty ratio of the second inverter is greater than a predetermined value and, in the step (b), adjusting the phase difference between the output of the first inverter and the output of the second inverter until the difference between the duty ratio of the first inverter and the duty ratio of the second inverter is less than or equal to the predetermined value.

Preferably, in the step (a), determining that a deviation in alignment with the corresponding power supply unit has occurred if a difference between outputs of the respective rectifiers connected with pickup coils of the corresponding pickup is greater than a predetermined value and, in the step (b), adjusting the phase difference between the output of the first inverter and the output of the second inverter until the difference between the outputs of the respective rectifiers of the corresponding pickup is less than or equal to the predetermined value.

Preferably, in the step (b), adjusting the phase difference between the output of the first inverter and the output of the second inverter based on an estimated initial phase.

Preferably, in the step (b), the adjustment of the phase difference between the output of the first inverter and the output of the second inverter is made using an optimization algorithm.

The optimization algorithm may be a gradient descent method and the gradient descent method may be based on predetermined angular intervals.

The method may further comprise the steps of: (c) determining that an output of the corresponding pickup is at or above a required level; (d) calculating, if the output of the corresponding pickup in the step (c) is less than the required level, duty ratios of the first inverter and of the second inverter to reach the output to the required level; and (e) applying, if the duty ratios calculated in the step (d) are less than a predetermined upper limit value, the duty ratio, or, if greater than the upper limit value, increasing DC input voltages of the first inverter and the second inverter.

The present invention provides a multiphase power supply for wireless power transmission in which the coupling coefficient between different power supply coils is low and the output of the power supply coils can be controlled to be uniform even when a deviation occurs in the alignment of the power supply coils with the pickup.

Further, a method is provided, in a multiphase power supply for wireless power transmission comprising a plurality of power supply coils, for controlling the output of the power supply coils to be uniform even when a deviation occurs in the alignment of the power supply coils with the pickup.

BRIEF DESCRIPTION OF THE DRAWINGS

FIG. 3 is a drawing illustrating a simulation calculation of the inductance and coupling coefficient between each coil of the multiphase power supply and the corresponding pickup shown in FIG. 2.

FIG. 8 is a drawing illustrating a case of applying a gradient descent method as an example of performing phase control according to the present invention by an optimization algorithm.

FIG. 9 is a flow diagram illustrating a method of estimating and determining an initial phase setting in phase control according to the present invention.

FIG. 10 is a diagram illustrating the results of measuring the duty and output of an inverter before performing phase control and the duty and output of an inverter after performing phase control in a multiphase power supply in which the control method according to the present invention is implemented.

DETAILED DESCRIPTION

Hereinafter, embodiments according to the present invention will be described in detail with reference to the accompanying drawings. The same or similar components are given the same or similar drawing designations, and redundant descriptions thereof are omitted. In describing the embodiments disclosed herein, detailed description of related known art is omitted if it is determined that such detailed description would obscure the essence of the embodiments disclosed herein. The accompanying drawings are intended to facilitate understanding of the embodiments disclosed herein, but the technical ideas disclosed herein are not limited by the accompanying drawings and should be understood to include all modifications, equivalents, or substitutions that are within the scope of the ideas and technology of the present invention. Terms containing ordinal numbers, such as first, second, and the like, may be used to describe various components, but such terms are used only to distinguish one component from another, and such components are not limited by such terms. Expressions in the singular include the plural, unless the context clearly indicates otherwise.

The terms "including," "comprising," "having" or "having" as used herein are to be understood as limiting the presence of the features, steps, components or combinations thereof described and are not intended to exclude the possibility that one or more other features, steps, components or combinations thereof may be present or added.

Figure 1:
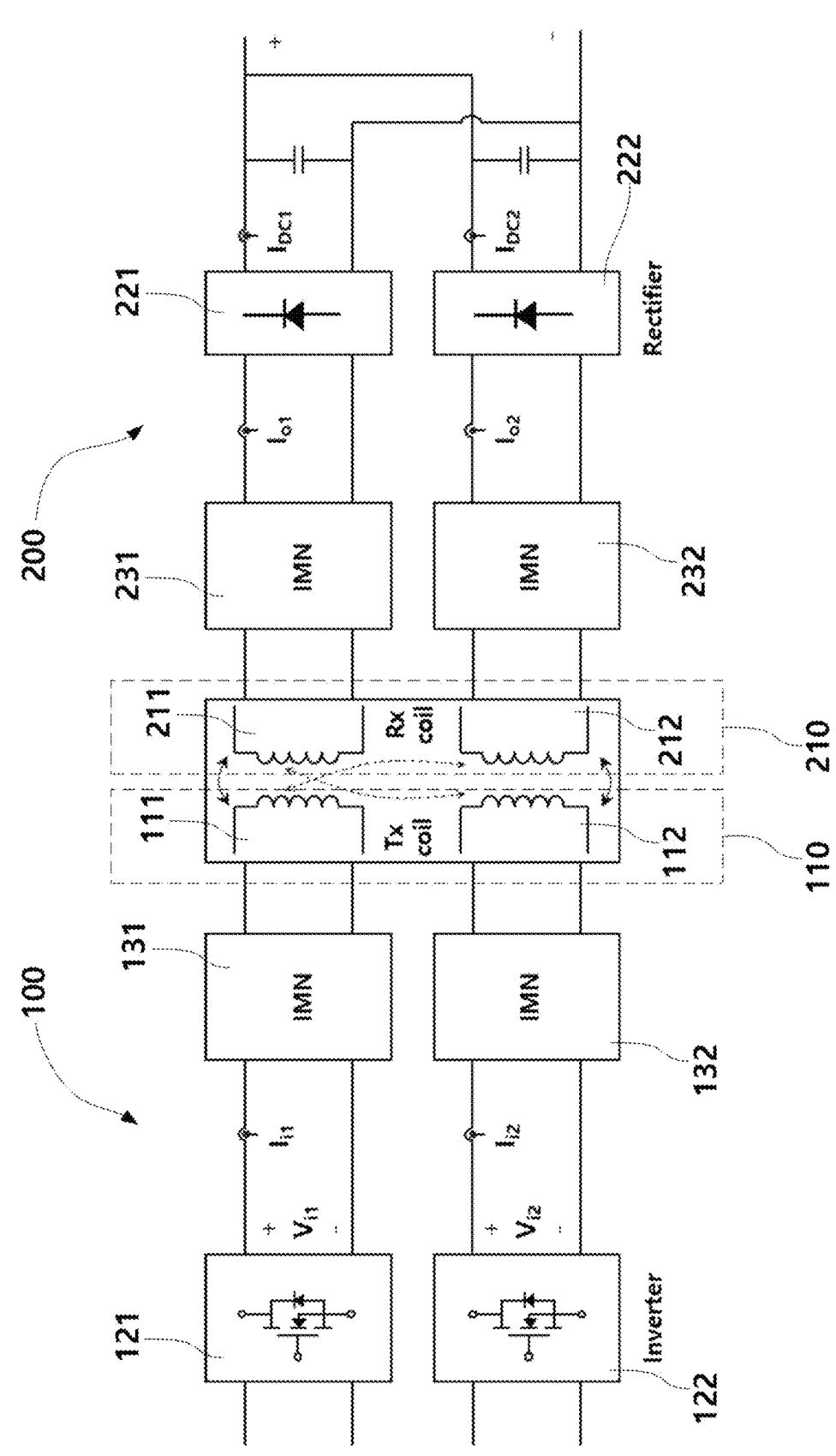
FIG. 1 is a schematic drawing of a wireless power transmission system including a multiphase power supply according to the present invention.

FIG. 1 schematically illustrates a multiphase power supply system for wireless power transmission according to one embodiment of the present invention. The illustrated power supply system includes a power supply 100 comprising two power supply coils 110 and a pickup 200 comprising two corresponding pickup coils 210.

The power supply coil 110 comprises a first power supply coil 111 and a second power supply coil 112. A coupling coefficient between the first power supply coil 111 and the second power supply coil 112 has a value substantially close to zero (0) when the power supply 100 and the pickup 200 are aligned. The pickup coil 210 comprises the same number of pickup coils as the power supply coil 110, namely two pickup coils 211, 212. Preferably, the coupling coefficient of the first pickup coil 211 and the second pickup coil 212 has a value substantially close to zero (0) with the power supply 100 and the pickup 200 aligned. Furthermore, the coupling coefficients of the first power supply coil 111 and the second pickup coil 212 and the coupling coefficients of the second power supply coil 112 and the first pickup coil 211 also have values substantially close to zero (0). However, this is for ease of description and is not necessarily limiting, and the coupling coefficient between each of the coils described above may have a value greater than zero (0). For example, it may have a value of about 0.3, as in the above mentioned document.

The power supply coils 111, 112 are each associated with a controllable inverter 121, 122. An impedance matching network 131, 132 is arranged between the power supply coils 111, 112 and the inverters 121, 122, respectively. A control unit (not shown) of the inverters 121, 122 controls the inverters 121, 122 such that, in the event of a deviation in the alignment between the power supply 100 and the pickup 200, the total output of the pickup 200 satisfies the required output, and the outputs of each of the pickup coils 211, 212 are uniform with each other. Specific control methods will be described later.

Further, the power supply 100 and the pickup 200 include a communication unit (not shown) for exchanging information. Through the communication unit, the power supply 100 can receive information required for controlling the power supply 100 according to the present invention, such as the amount of power required by the pickup 200, the output of each pickup coil, and the like.

Figure 2:
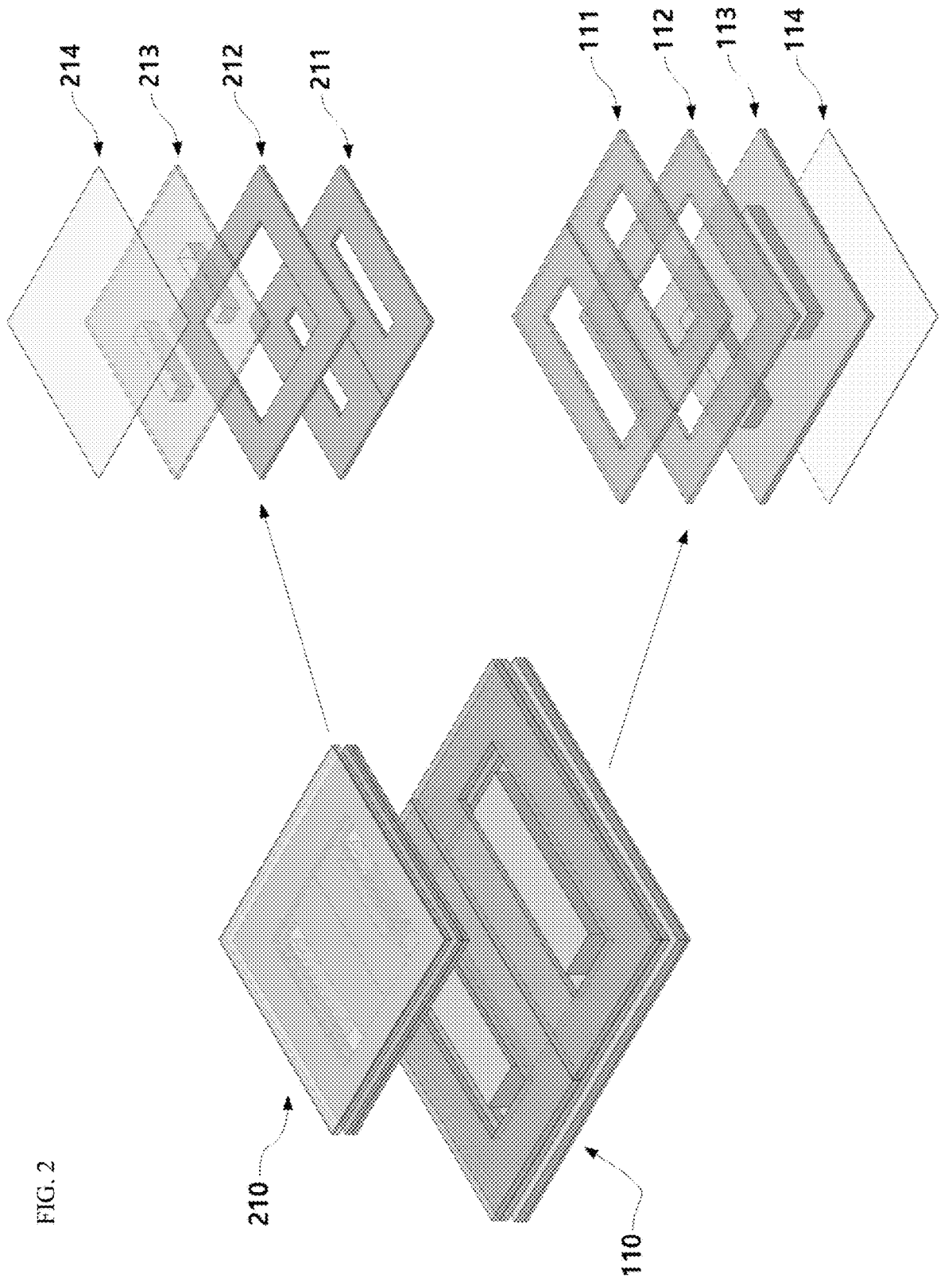
FIG. 2 is a drawing illustrating a configuration of a multiphase power supply and a corresponding pickup according to one embodiment of the present invention.

FIG. 2 illustrates an example of a power supply coil 110 and a pickup coil 210 satisfying the conditions described above.

The illustrated power supply coil 110 comprises a DD coil as a first power supply coil 111, a circular coil as a second power supply coil 112, and further comprises a power supply core 113 and a shielding member 114. The pickup coil 210 likewise comprises a DD coil as a first pickup coil 211 and a circular coil as a second pickup coil 212, and further comprises a pickup core 213 and a shielding member 214.

The coupling coefficient between the DD coil and the circular coil has a value substantially close to zero (0). Therefore, the coupling coefficient between the first power supply coil 111, which is a DD coil, and the second power supply coil 112, which is a circular coil, is substantially zero (0). Furthermore, the coupling coefficient between the first power supply coil 111, which is a DD coil, and the second pickup coil 212, which is a circular coil, is also substantially zero (0).

In FIG. 3, simulation-based values for the self-inductance, mutual inductance, and coupling coefficient between the power supply coil 110 and the pickup coil 210 shown in FIG. 2 are presented. Also, the values for each parameter are presented when the power supply coil 110 and the pickup coil 210 are in an aligned state, as well as when deviations occur in the x-direction and/or y-direction.

Figure 4:
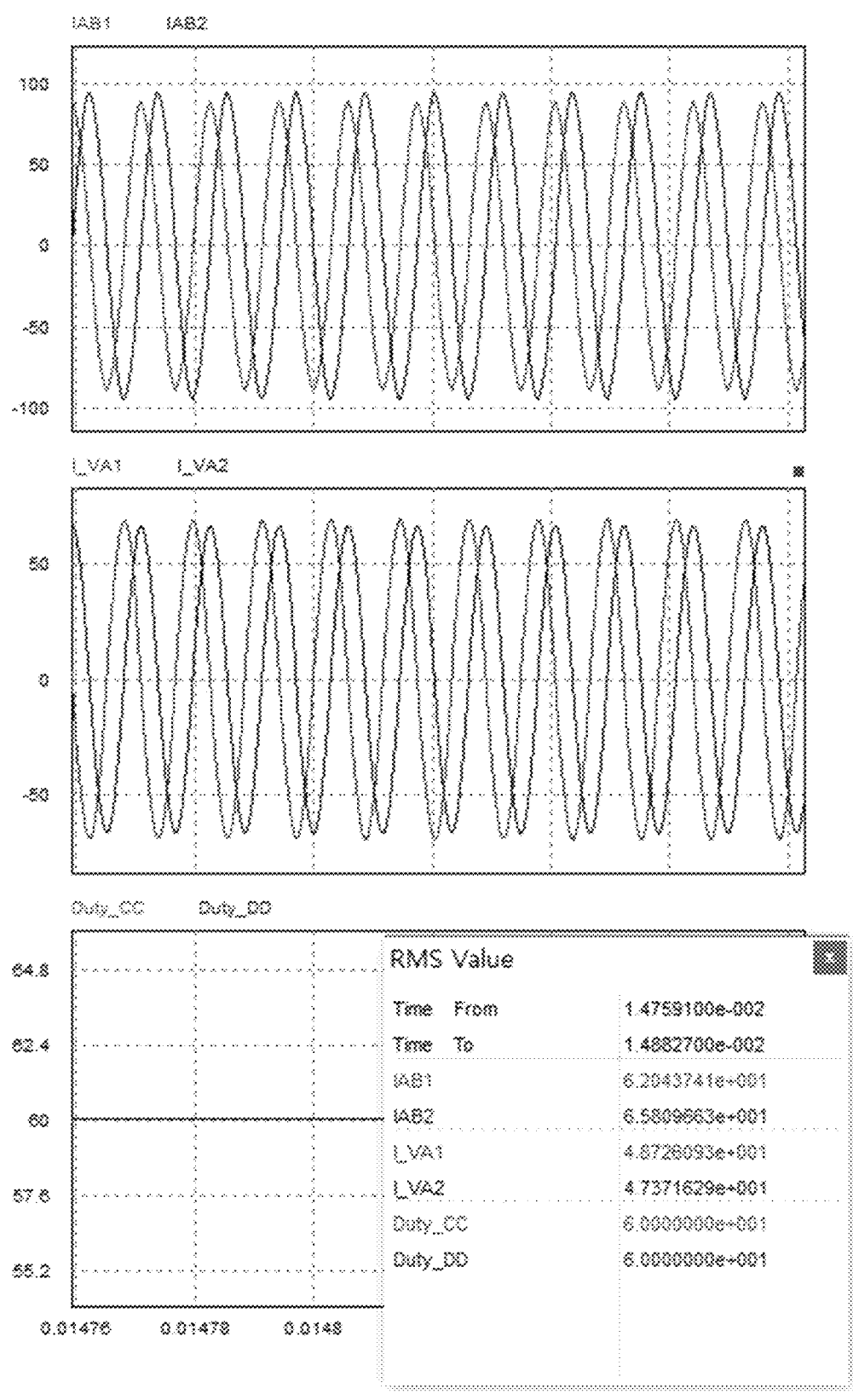
FIG. 4 is a drawing showing, in order from top to bottom, the output of the inverter of the multiphase power supply having the configuration shown in FIG. 3, the output of the rectifier of the corresponding pickup, and the duty of the inverter.

In the state where the power supply 100 and the pickup 200 are aligned (X: 0 mm, Y: 0 mm), the coupling coefficient between the first power supply coil, which is a DD coil, and the first pickup coil, which is also a DD coil, is 0.089, and the coupling coefficient between the second power supply coil and the second pickup coil, which are circular coils, respectively, is 0.110. Even if the values of the two coupling coefficients are designed to match, it is difficult to match them precisely in an actual implemented power supply and pickup. In the simulation, the values of the two coupling coefficients are set differently to reflect this. As a result, even when the power supply 100 and the pickup 200 are aligned, the output of each pickup coil 210 has a slightly different value. In FIG. 4, the output of each inverter of the power supply 100, the output of each coil of the pickup, and the duty ratio of each inverter of the power supply 100 are shown, in order from top to bottom, when the power supply 100 and the pickup 200 are aligned. As can be seen, the outputs of the inverters and the outputs of the pickup coils, except for the duty ratios, are slightly different even when the power supply and the pickup are aligned. In the illustrated case, the duty ratio is shown to be the same by chance, but in practice, differences in duty ratio may occur. This is taken into account when controlling the power supply according to the present invention, i.e., even if there is a difference in these values, it is determined that there is no deviation between the power supply and the pickup within a certain range. More specific details will be provided in the following description of the control method. On the other hand, in the aligned state (X: 0 mm, Y: 0 mm), the coupling coefficient between the first supply coil, which is a DD coil, and the second pickup coil, which is a circular coil, and the coupling coefficient between the second supply coil, which is a circular coil, and the first pickup coil, which is a DD coil, is substantially zero (0).

The coupling coefficient between the power supply coils and the pickup coils varies when the power supply and pickup are out of alignment. FIG. 3 shows, as an example, the change in inductance and coupling coefficient between each coil when the pickup is deviated 75 mm in the x-direction and 100 mm in the y-direction relative to the power supply. Due to these changes, the state of the power circuit connected to each power supply coil and the power circuit connected to each pickup coil changes. In particular, the misalignment of the power supply and the pickup will, in most cases, result in uneven output of each pickup coil. Since it is desirable that the output of each pickup coil is uniform, the present invention controls the power supply to ensure that the output of each pickup coil is uniform.

Figure 5:
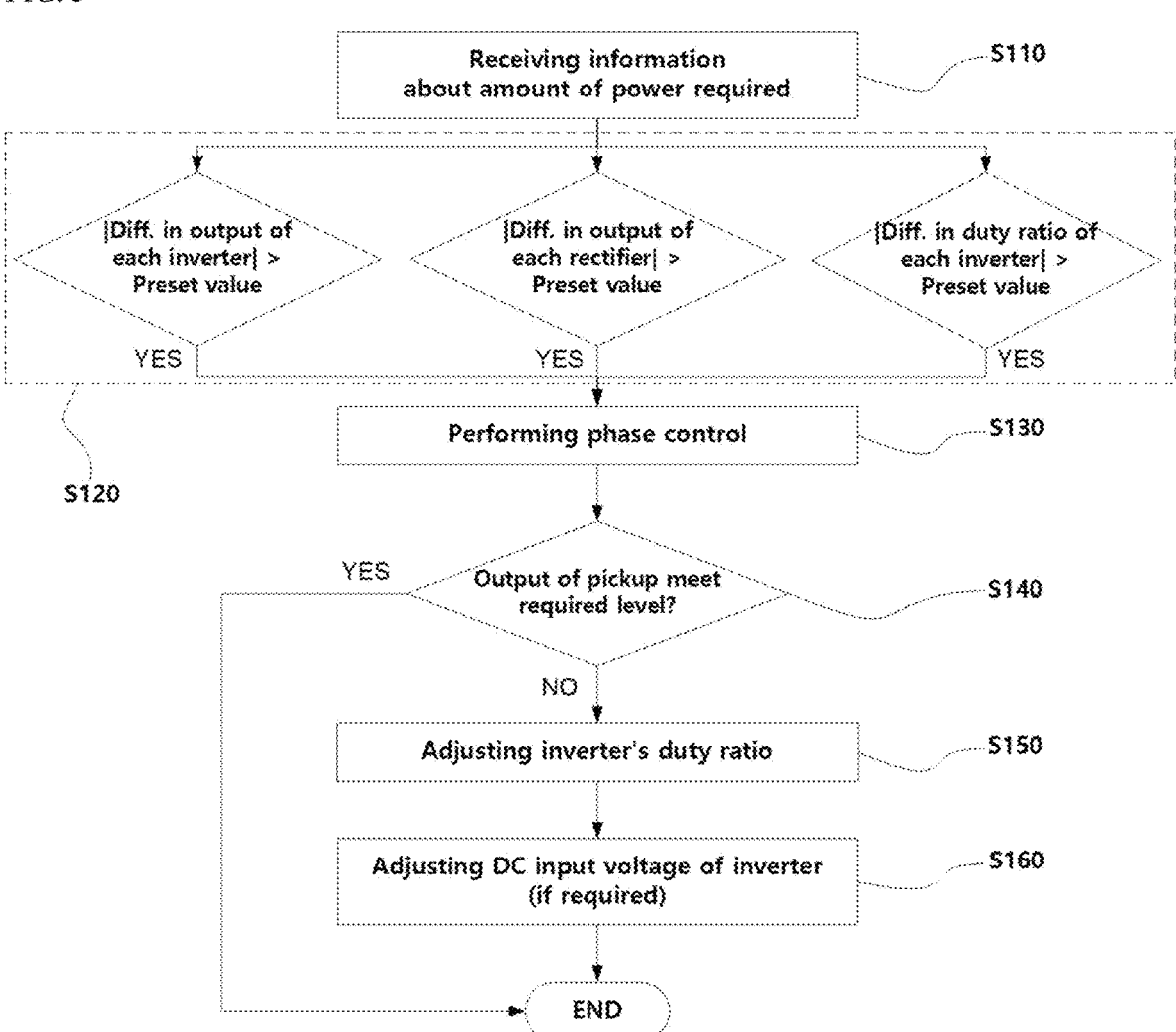
FIG. 5 is a flow diagram illustrating a method of controlling a multiphase power supply according to one embodiment of the present invention shown in FIG. 1.

In FIG. 5, a flowchart of a method for controlling a multiphase power supply for wireless power transmission according to one embodiment of the present invention is schematically illustrated.

The power supply 100 receives information about a required amount of power, for example, a target current required by the vehicle's battery, from the pickup 200 via a communication unit (not shown) S110. The power supply 100 then determines an alignment status with the pickup 200 (S120). In the illustrated embodiment, the alignment status is determined in three ways 1) comparing the magnitude of the difference between the outputs of the inverter connected to each power supply coil and the preset value, 2) comparing the magnitude of the difference between the outputs of the rectifier connected to each pickup coil and the preset value, and 3) comparing the magnitude of the difference between the duty ratio of the inverter connected to each power supply coil and the preset value. If any of the three is greater than the preset value, it is judged that the power supply and pickup are misaligned. As described above with reference to FIG. 3, by design, the three values should not differ in the aligned state, but since there are tolerances in the actual implemented power supply and pickup, a predetermined difference exists even in the aligned state. Therefore, if there is a difference within an allowed range, the power supply and the pickup are considered to be aligned. If it is determined that the power supply and the pickup are misaligned, that is, if any of the above three values is greater than the preset value, phase control according to the present invention is performed (S130). The specific method of phase control will be described later.

When all of the above three values become smaller than the preset value due to the phase control, the phase of the output of the inverter is determined based on the phase value determined by the phase control (S140). Thereby, the output of each pickup coil is uniformized (see FIG. 7). The output of the pickup is then checked to ensure that it has reached the previously required level (S140). If the output of the pickup is lower than the required level, the duty ratio of the power supply inverter is calculated (S150) to bring the output to the required level. Since the devices comprising the inverter have a tolerable operating range, the duty ratio cannot be increased indefinitely. Therefore, a predetermined upper limit is set for the duty ratio of the inverter. If the calculated duty ratio is less than the upper limit, the duty ratio of the inverter is adjusted to the calculated value because it is allowed as the operating range of the inverter. If the calculated duty ratio is larger than the upper limit value, after setting the duty ratio to the upper limit value, the magnitude of the DC input voltage of the inverter is increased so that the output of the pickup can reach the required level (S160).

Figure 6:
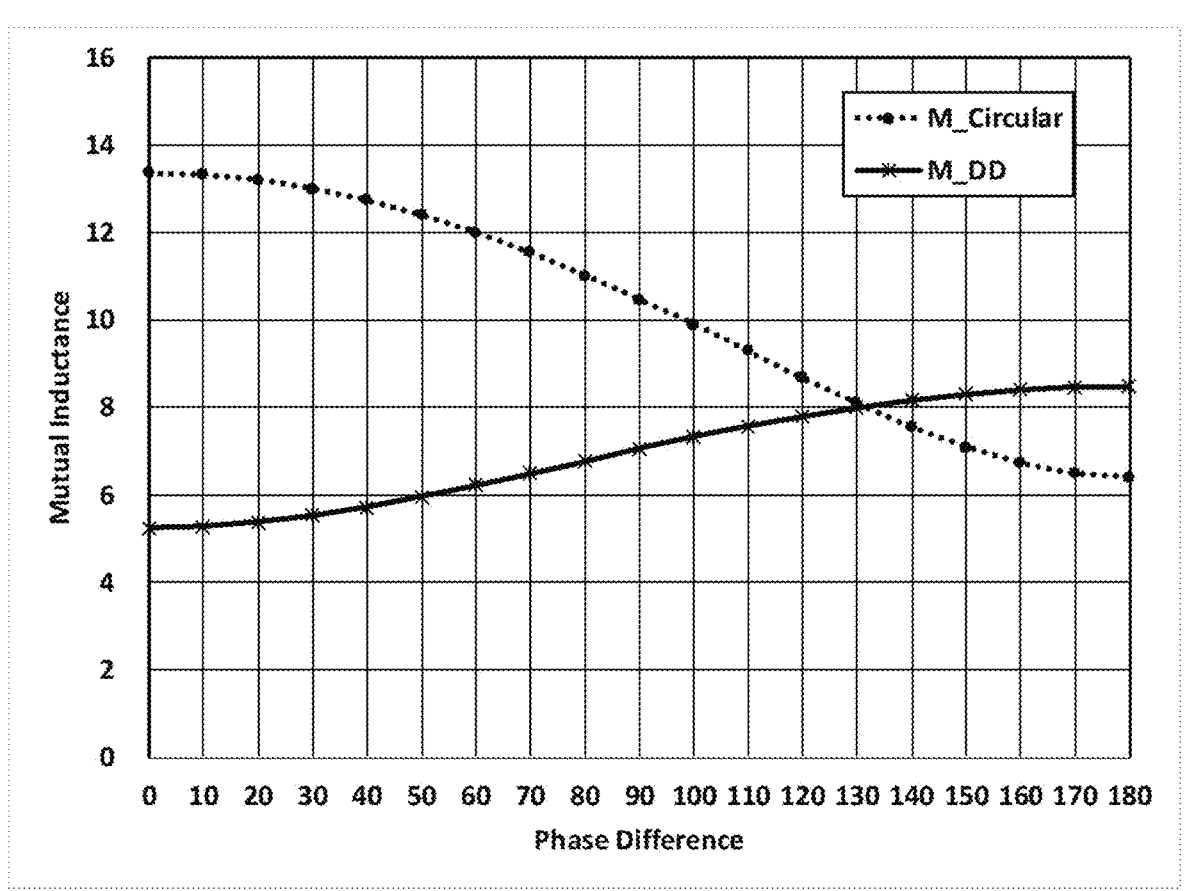
FIG. 6 is a graph indicating a change in mutual inductance between a power supply coil and a pickup coil when changing phases according to phase control in a multiphase power supply having the configuration shown in FIG. 3.
Figure 7:
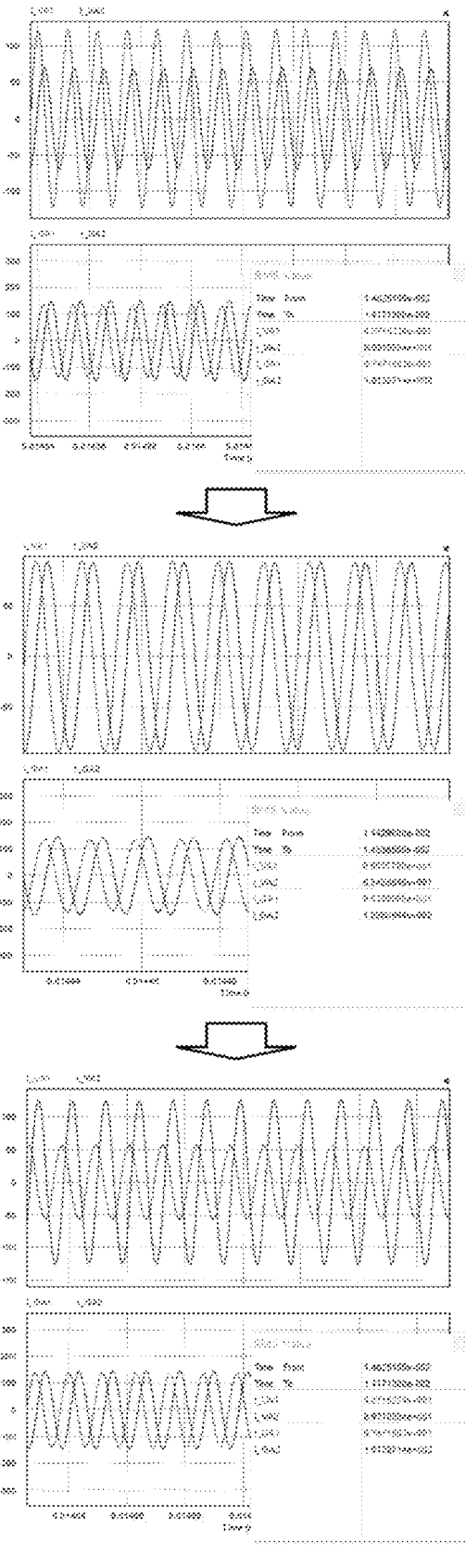
FIG. 7 is a diagram illustrating a change in the output of a pickup corresponding to a phase change of 10 degrees in phase control according to the present invention.

FIG. 6 illustrates one embodiment of phase control according to the present invention. In the phase control according to the present invention, the output of each coil of the pickup is uniformized by adjusting the phase difference of the outputs of the inverter associated with each power supply coil. FIG. 6 illustrates the state in which the mutual inductance of each pickup coil changes when the phase difference of the outputs of each inverter is increased by 10 degrees in the simulation shown in FIG. 3, when the x-directional deviation is 75 mm and the y-directional deviation is 100 mm. Initially, the mutual inductance (M_DD) of the first pickup coil (DD coil) is 5.25, and the mutual inductance (M_Circular) of the second pickup coil (circular coil) is 13.36. In this case, the output of the first and second pickup coils is very uneven. If the phase difference between the inverters of the power supply unit is increased by 10 degree intervals through phase control, the mutual inductance of the first pickup coil increases and the mutual inductance of the second pickup coil decreases. When the phase difference of the inverter is about 130 degrees, the mutual inductance of the two pickup coils has almost the same value. In this case, the output of the two pickup coils becomes almost uniform. In FIG. 7, the output of the two pickup coils as the phase is varied is shown. The center graph shows the output of the two pickup coils when the phase difference is optimal, the upper graph shows the output when the phase difference is 10 degrees less than optimal, and the lower graph shows the output when the phase difference is 10 degrees greater than optimal.

While FIGS. 6 and 7 illustrate simply varying the phase difference in 10 degree intervals, a variety of known optimization algorithms can be used for more rapid control. A variety of optimization algorithms can be applied, including gradient descent, for example, PID control, search algorithms, and techniques using artificial intelligence. In FIG. 8, an example method of performing phase control using a gradient descent method is illustrated. In the example shown, current and previous measurements of the output current of each inverter of the power supply are provided as inputs. The difference between these measurements is normalized and multiplied by a predetermined ratio (a, learning rate) to determine the phase difference value to be changed. The determined phase difference value is summed with the initial setting value to determine the phase of each inverter. The initial value may be zero (0), or it may be an estimated value as described later. To prevent the phase value determined at the output from exceeding a predetermined range, an upper limit can be set in advance (Phase Limiter). Operate each inverter (Plant in FIG. 8) of the power supply with the determined phase value. Adjusting the phase difference between the outputs of the inverters can be done by fixing the phase of the output of one inverter and adjusting the phase of the output of another inverter, or by adjusting the outputs of multiple inverters simultaneously.

In FIG. 9, a method for estimating an initial set point in phase control and determining it to be a non-zero value is schematically illustrated. In the example shown, after estimating in which direction the power supply and pickup are out of phase, an appropriate phase difference for that location is determined as the initial setpoint. First, the mutual inductance between each coil in the case where the power supply and the pickup are aligned and in the case where they are misaligned is determined by simulation or experiment, and these values are stored (S210). Then, the appropriate phase difference is calculated for each of the mutual inductances stored by simulation or experiment, and the phase of the output of each inverter is determined and stored as an initial setting (S220). In phase control, the output of the pickup (or power supply) is measured (S230), and the voltage of each state is estimated by combining the previously stored mutual inductance and the measured output, and the mutual inductance that induces the largest value is determined (S240). The mutual inductance thus determined and the corresponding initial setting value are determined as an estimate of the phase (S250).

As described in FIGS. 6 and 7, in the case of simply varying the phase difference, in addition to the problem that the time to reach the optimum value is prolonged, it may exceed the range allowed by the devices of the inverter. Therefore, by using the initial setting as described above, the time to reach the optimum value is reduced and the devices of the inverter are prevented from being damaged by overload.

FIG. 10 shows the experimental results of applying phase control to a multiphase power supply implemented in practice according to the present invention. The upper graph shows the duty and output of the two inverters of the power supply before phase control is applied, and the lower graph shows the duty and output of the inverters after phase control is applied. As shown, before phase control was applied, the phase difference between the two inverters was 85 degrees, which was changed to 120 degrees after phase control was applied. Also, the duty ratios of the two inverters were different before the phase control was applied and became almost identical after the phase control was applied. It can be seen that the magnitudes of the outputs of the inverters are almost the same.

Figure 11A:
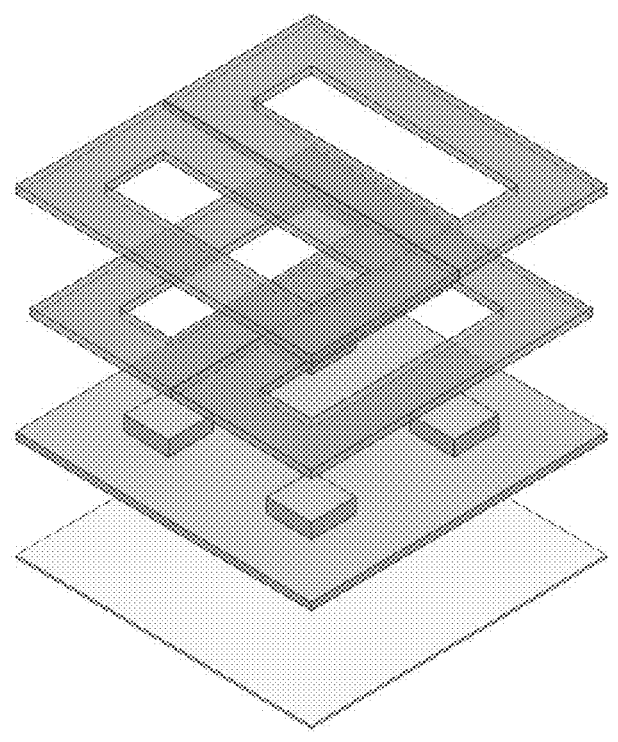
FIG. 11A is a drawing illustrating other embodiment of a multiphase power supply according to the present invention, wherein the combination of power supply coils is different.

In the above embodiments, the two coils of the power supply and the pickup are described as a DD coil and a circular coil, respectively, but the multiphase power supply of the present invention can be configured in various ways, provided that the coupling coefficient is less than a predetermined value (e.g., 0.3). For example, as shown in FIG. 11A, a DD coil/DD coil combination is possible.

Figure 11B:
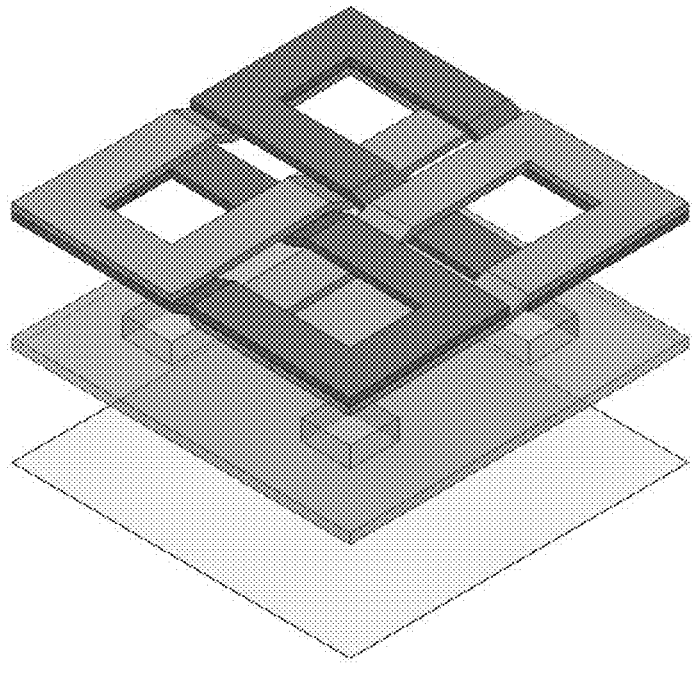
FIG. 11B is a drawing illustrating another embodiment of a multiphase power supply according to the present invention, wherein the combination of power supply coils is different.

Also shown in FIG. 11B is a DD coil/DD coil combination, wherein a part of one DD coil is disposed on top of the other DD coil and the remaining part is disposed on the bottom of the other DD coil. In the configuration shown, space utilization is improved because the height at which the coils are stacked is reduced, and a uniform magnetic field is created because the average distance between each coil and the core is approximately the same. In addition, power density is improved and heat generation is reduced.

The above description refers to a two-phase power supply, i.e., a power supply and a pickup each having two coils, but the control method of a multi-phase power supply according to the present invention can also be applied to a power supply having three or more phases.

In the case of three power supply coils, the power supply coil that induces a voltage close to the rated voltage is selected as the master, and the remaining two power supply coils are set as two slaves. Compare the output of the two slave power supply coils with the output of the master power supply coil, and perform output control including phase control on the slave power supply coil with the larger difference. In addition to phase control, the output control includes adjustment of the duty ratio as described above and adjustment of the inverter DC input voltage, and these adjustments are common to all power supply coils. Phase control is then performed on the other slave power supply coils. If the output of the pickup does not reach the required level at the first attempt, the process is repeated until the required level is reached.

Figure 12A:
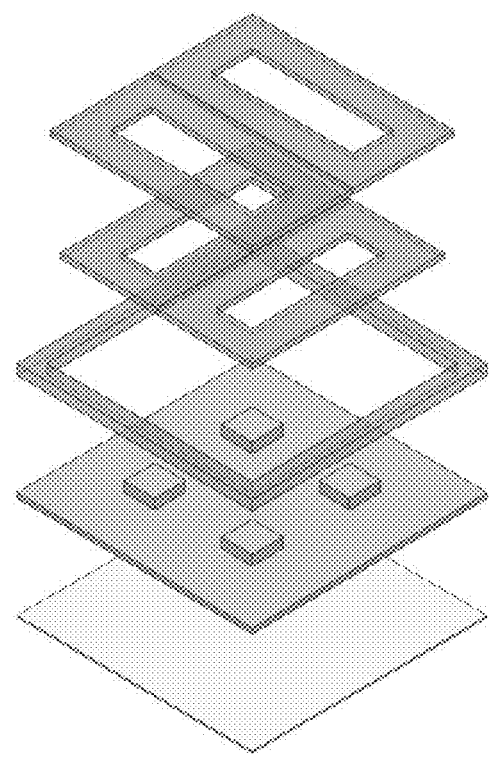
FIG. 12A is a drawing illustrating still another embodiment of a multiphase power supply according to the present invention, wherein there are three feeding coils.
Figure 12B:
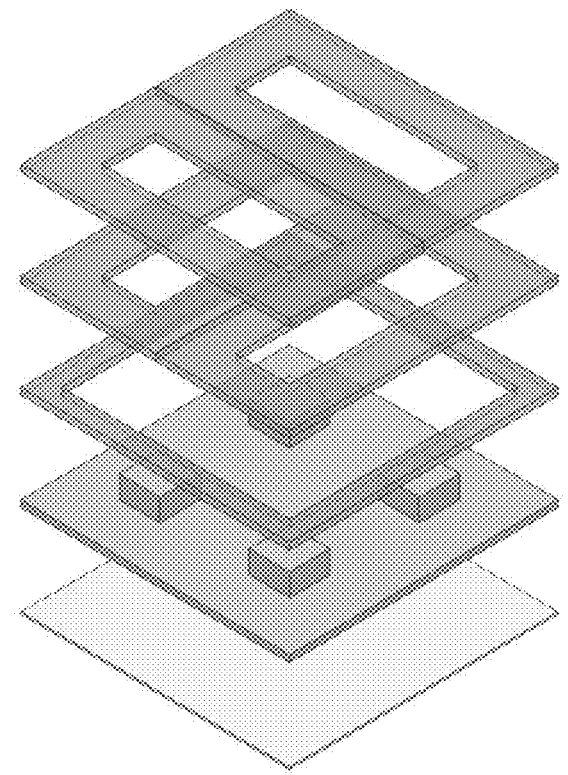
FIG. 12B is a drawing illustrating still another embodiment of a multiphase power supply according to the present invention, wherein there are three feeding coils.

FIGS. 12A and 12B illustrate examples of three coil configurations for three-phase cases. The examples shown in both figures are circular/DD/DD configurations, but in the example shown in FIG. 12A, the circular coil houses two DD coils inside, while in the example shown in FIG. 12B, the circular coil and two DD coils are stacked in three layers. The former has the advantage of reducing the height of the combination of coils compared to the latter.

The foregoing detailed description is not to be construed as limiting in any respect and should be considered exemplary. The scope of the invention is to be determined by a reasonable interpretation of the appended claims, and all modifications within the equivalent scope of the invention are included in the scope of the invention.

What is claimed is:

1. A power supply apparatus for wireless power transmission, comprising:
a first power supply coil;
a first inverter electrically connected with the first power supply coil;
a second power supply coil having a coupling coefficient with the first power supply coil below a predetermined coupling-coefficient threshold;

a second inverter electrically connected to the second power supply coil and controllable independently of the first inverter; and
a control unit for regulating a phase difference between an output of the first inverter and an output of the second inverter when it is determined that a misalignment for a corresponding pickup has occurred,
wherein the control unit determines that the misalignment has occurred when at least one of (i) a first difference between the output of the first inverter and the output of the second inverter, (ii) a second difference between a first rectified output and a second rectified output corresponding to power received by the corresponding pickup from the first power supply coil and the second power supply coil, and (iii) a third difference between a duty ratio of the first inverter and a duty ratio of the second inverter exceeds a predetermined value defined as an allowed tolerance in an aligned state, and adjusts the phase difference between the output of the first inverter and the output of the second inverters until a corresponding one or more of (i) the first difference, (ii) the second difference, and (iii) the third difference used in determining the misalignment become equal to or less than the predetermined value, and
wherein the control unit includes a phase limiter configured to prevent a phase value for said regulating from exceeding a first predetermined upper limit.

2. The power supply apparatus of claim 1, wherein the first power supply coil and the second power supply coil are a combination of a circular coil and a DD coil or a combination of a DD coil and a DD coil.

3. The power supply apparatus of claim 2, wherein the first power supply coil and the second power supply coil are arranged to at least partially overlap each other.

4. The power supply apparatus of claim 3, further comprising a power supply core, and wherein the power supply core includes protruded portions that fill empty spaces remaining after the first power supply coil or the second power supply coil is not superimposed on each other.

5. The power supply apparatus of claim 1, wherein the coupling coefficient between the first power supply coil and the second power supply coil is 0.3 or less.

6. The power supply apparatus of claim 1, wherein, if an output of the corresponding pickup is less than a required level, the control unit calculates a duty ratio of the first inverter and the second inverter for the output to reach the required level, and
wherein, if the calculated duty ratio is less than a second predetermined upper limit, the control unit applies the calculated duty ratio or, if the calculated duty ratio is greater than the second predetermined upper limit, the control unit increases DC input voltages of the first inverter and the second inverter.

7. The power supply apparatus of claim 1, further comprising:
a third power supply coil having a coupling coefficient with the first power supply coil and the second power supply coil below the predetermined coupling-coefficient threshold;
a third inverter electrically connected to the third power supply coil and independently controllable with respect to the first inverter and the second inverter, and
wherein the control unit is capable of controlling a phase of the output of the third inverter.

8. A method for controlling the power supply apparatus for wireless power transmission as recited in claim 1, comprising the steps of:

(a) determining whether a misalignment for a corresponding pickup has occurred when at least one of (i) a first difference between an output of the first inverter and an output of the second inverter, (ii) a second difference between a first rectified output and a second rectified output corresponding to power received by the corresponding pickup from the first power supply coil and the second power supply coil, and (iii) a third difference between a duty ratio of the first inverter and a duty ratio of the second inverter exceeds a predetermined value defined as an allowed tolerance in an aligned state; and (b) adjusting a phase difference between the output of the first inverter and the output of the second inverter with a phase limiter that prevents a phase value for the adjusting from exceeding a first predetermined upper limit until a corresponding one or more of (i) the first difference, (ii) the second difference, and (iii) the third difference used in the determining the misalignment become equal to or less than the predetermined value.

9. The method of claim 8, wherein, in the step (b), adjusting the phase difference between the output of the first inverter and the output of the second inverter is performed based on an estimated initial phase.

10. The method of claim 8, wherein, in the step (b), the adjustment of the phase difference between the output of the first inverter and the output of the second inverter is made using an optimization algorithm.

11. The method of claim 10, wherein the optimization algorithm is a gradient descent method.

12. The method of claim 11, wherein the gradient descent method is based on predetermined angular intervals.

13. The method of claim 8, further comprising the steps of:

(c) determining that an output of the corresponding pickup is at or above a required level;

(d) calculating, if the output of the corresponding pickup in the step (c) is less than the required level, duty ratios of the first inverter and of the second inverter to reach the output to the required level; and (e) applying, if the duty ratios calculated in the step (d) are less than a second predetermined upper limit, the duty ratio, or, if greater than the second predetermined upper limit, increasing DC input voltages of the first inverter and the second inverter.

* * * * *